(12) United States Patent
Tanida et al.

(10) Patent No.: US 8,387,992 B2
(45) Date of Patent: Mar. 5, 2013

(54) SEALING DEVICE WITH ENCODER

(75) Inventors: Masayuki Tanida, Fukushima (JP); Kenichi Yarimizu, Fukushima (JP)

(73) Assignee: NOK Corporation, Tokyo (JP)

( * ) Notice: Subject to any disclaimer, the term of this patent is extended or adjusted under 35 U.S.C. 154(b) by 1143 days.

(21) Appl. No.: 11/632,269

(22) PCT Filed: Jun. 6, 2005

(86) PCT No.: PCT/JP2005/010317
§ 371 (c)(1),
(2), (4) Date: Jan. 11, 2007

(87) PCT Pub. No.: WO2006/006322
PCT Pub. Date: Jan. 19, 2006

(65) Prior Publication Data
US 2007/0257446 A1    Nov. 8, 2007

(30) Foreign Application Priority Data

Jul. 14, 2004  (JP) .................................. 2004-207081

(51) Int. Cl.
*F16J 15/32* (2006.01)
(52) U.S. Cl. .................. 277/549; 123/197.1; 277/500
(58) Field of Classification Search ............... 123/197.1; 310/66, 68 B; 384/448, 544; 324/174
See application file for complete search history.

(56) References Cited

U.S. PATENT DOCUMENTS 5,382,098 A * 1/1995 Rigaux et al. ................. 384/448
5,969,518 A   10/1999 Merklein et al.
6,345,825 B1 * 2/2002 Guth et al. .................... 277/317
7,338,211 B2 * 3/2008 Bianco et al. ................. 384/448
7,341,297 B2 * 3/2008 Nakamura et al. ......... 296/24.34

FOREIGN PATENT DOCUMENTS

| BR | PI 9704461-0 A | 12/1998 |
| DE | 196 44 744 A1 | 5/1998 |
| FR | 2 755 193 A1 | 4/1998 |
| JE | 2002-227860 | 8/2002 |
| JP | H6-4470 | 1/1994 |
| JP | H10-160744 | 6/1998 |
| JP | 2000-46186 | 2/2000 |

(Continued)

OTHER PUBLICATIONS

International Search Report for PCT/JP2005/010317, ISA/JP, (in English), mailed Sep. 13, 2005.

*Primary Examiner* — Lindsay Low
(74) *Attorney, Agent, or Firm* — Daniel J. Sepanik, Esq.; Harness, Dickey & Pierce, P.L.C.

(57) ABSTRACT

To reduce an axial installation width of a sealing device 1 comprising an oil seal 5 mounted in an inner periphery of a shaft hole 3 of a housing 2 and slidably contacted with an outer periphery of a rotating shaft 4 and a magnetic encoder 6 mounted on the rotating shaft 4 so as to be rotated therewith, as well as to improve sealing performance, the oil seal 5 is provided with a metal ring 7 having at least a part thereof disposed at an inner periphery side of the cylindrical portion 10b in the magnetic encoder 6 so that the oil seal 5 and magnetic encoder 6 are overlapped with each other in an axial direction, and the oil seal 5 is provided with a seal lip 8e formed with a rubber-like elastic body and disposed towards an interior side A of a housing.

3 Claims, 7 Drawing Sheets

FOREIGN PATENT DOCUMENTS

| | | |
|---|---|---|
| JP | 2001-56236 | 2/2001 |
| JP | 2001-183384 | 7/2001 |
| JP | 2003-42175 | 2/2003 |
| JP | 2004-93554 | 3/2004 |
| JP | 2005-42866 | 2/2005 |
| WO | 2005/010382 A1 | 2/2005 |

* cited by examiner

SEALING DEVICE WITH ENCODER

This is a nationalization of PCT/JP2005/010317 filed Jun. 6, 2005 (now WO 2006/006322 published Jan. 19, 2006), which claims priority to Japanese Application No. 2004-207081 filed Jul. 14, 2004.

BACKGROUND OF THE INVENTION

1. Field of the Invention

The present invention relates to a sealing device with a magnetic encoder capable of sensing a rotation rate, rotational speed, rotational angle or the like of a rotating shaft. The sealing device according to the present invention may be mounted, for example, on an engine block of vehicles such as automobiles, so as to be slidingly contacted on an outer periphery of a crank shaft for sealing of sealed fluid such as engine oil and the like.

2. Description of the Conventional Art

A conventional sealing device 51 with an encoder as shown in FIG. 7 is known, and this sealing device 51 has an oil seal 54 mounted on an inner periphery of a shaft hole of a housing 52 and slidably contacted on an outer periphery of a rotating shaft 53, and a magnetic encoder 55 mounted on the rotating shaft 53 to be rotated therewith.

However, in the above-mentioned conventional sealing device 51, there is an disadvantage that relatively large installation space or width is needed in an axial direction, since a metal ring 56 of the oil seal 54 and the magnetic encoder 55 are arranged in series in an axial direction, i.e. the metal ring 56 and the magnetic encoder 55 are not arranged in an overlapped-relation with each other.

This is due to the fact that the magnetic encoder 55 is merely added to the conventional sealing device 51 in general having only the oil seal 54 as a constituent component. Since a space for installing the sealing device is limited, it is desirable that the installation width of the entire sealing device 51 in the axial direction is made as small as possible.

Further, although a seal lip 57 of the oil seal 54 is formed with a polymer material such as PTFE, and engine oil, which is fluid to be sealed, exists in an interior side A of the housing, the seal lip 57 is disposed towards an exterior side B of the housing. Therefore, the leak-out probability of the engine oil inside the housing is high, and when the engine oil leaks out and disperses, the engine oil may adhere to the magnetic encoder 55, causing detrimental effects on the magnetic function thereof.

For the conventional sealing device, refer to, for example, JP-2004-093554 A.

SUMMARY OF THE INVENTION

Problems to be Solved by the Invention

In view of the above, it is an object of the present invention to provide such a sealing device with a magnetic encoder that installation width in an axial direction can be reduced and it is another object of the present invention to provide such a sealing device with a magnetic encoder that sealing performance against sealed liquid such as engine oil can be enhanced.

Means for Solving the Problem

In order to achieve the above-mentioned object, a sealing device according to a first aspect of the present invention comprises an oil seal mounted in an inner periphery of a shaft hole of a housing and slidably contacted on an outer periphery of a rotating shaft, and a magnetic encoder mounted on the rotating shaft so as to be rotated therewith, wherein the oil seal is provided with a metal ring having at least a part thereof disposed at an inner periphery side of the magnetic encoder so that the oil seal and magnetic encoder are overlapped with each other in an axial direction.

Further, according to a second aspect of the present invention, in addition to the above first aspect, the oil seal is provided with a seal lip formed with a rubber-like elastic body and disposed towards an interior side of the housing.

Further, according to a third aspect of the present invention, in addition to the above first aspect, the metal ring of the oil seal integrally has an outer cylindrical portion fitted in the inner periphery of the shaft hole and an inner cylindrical portion disposed at an inner periphery side of the outer cylindrical portion, and at least a part of the inner cylindrical portion of the metal ring is disposed at an inner periphery side of the encoder, and at least a part of the encoder is disposed at an inner periphery side of the outer cylindrical portion.

Effects of the Invention

The present invention has the following advantages.

In the sealing device according to the first aspect with the above-mentioned configuration, since the oil seal is provided with a metal ring having at least a part thereof disposed at the inner periphery side of the magnetic encoder so that the oil seal and magnetic encoder are overlapped with each other in the axial direction, it becomes possible to narrow installation width of the entire sealing device in the axial direction by the overlapped amount of the oil seal and magnetic encoder. Therefore, it becomes possible to achieve the object to provide a sealing device with an encoder having compact structure in the axial direction.

In addition, in the sealing device according to the second aspect, since the oil seal is provided with the seal lip formed with a rubber-like elastic body and disposed towards the interior side, it becomes possible to improve the sealing performance due to the enhanced adhesion of the seal lip to the rotating shaft. Therefore, it is possible to provide a sealing device with an encoder, which is compact in the axial direction and excellent in sealing performance.

Further, in the sealing device according to the third aspect, since the metal ring is disposed such that at least a part of the inner cylindrical portion is fitted at the inner periphery side of the encoder, and at least a part of the encoder is fitted at the inner periphery side of the outer cylindrical portion, the axial installation width of the entire sealing device can be reduced further as compared with the invention according to the first aspect. Therefore, it is possible to provide a sealing device with an encoder having more compact structure in the axial direction.

EXPLANATION OF THE REFERENCE NUMERALS

Figure 1:
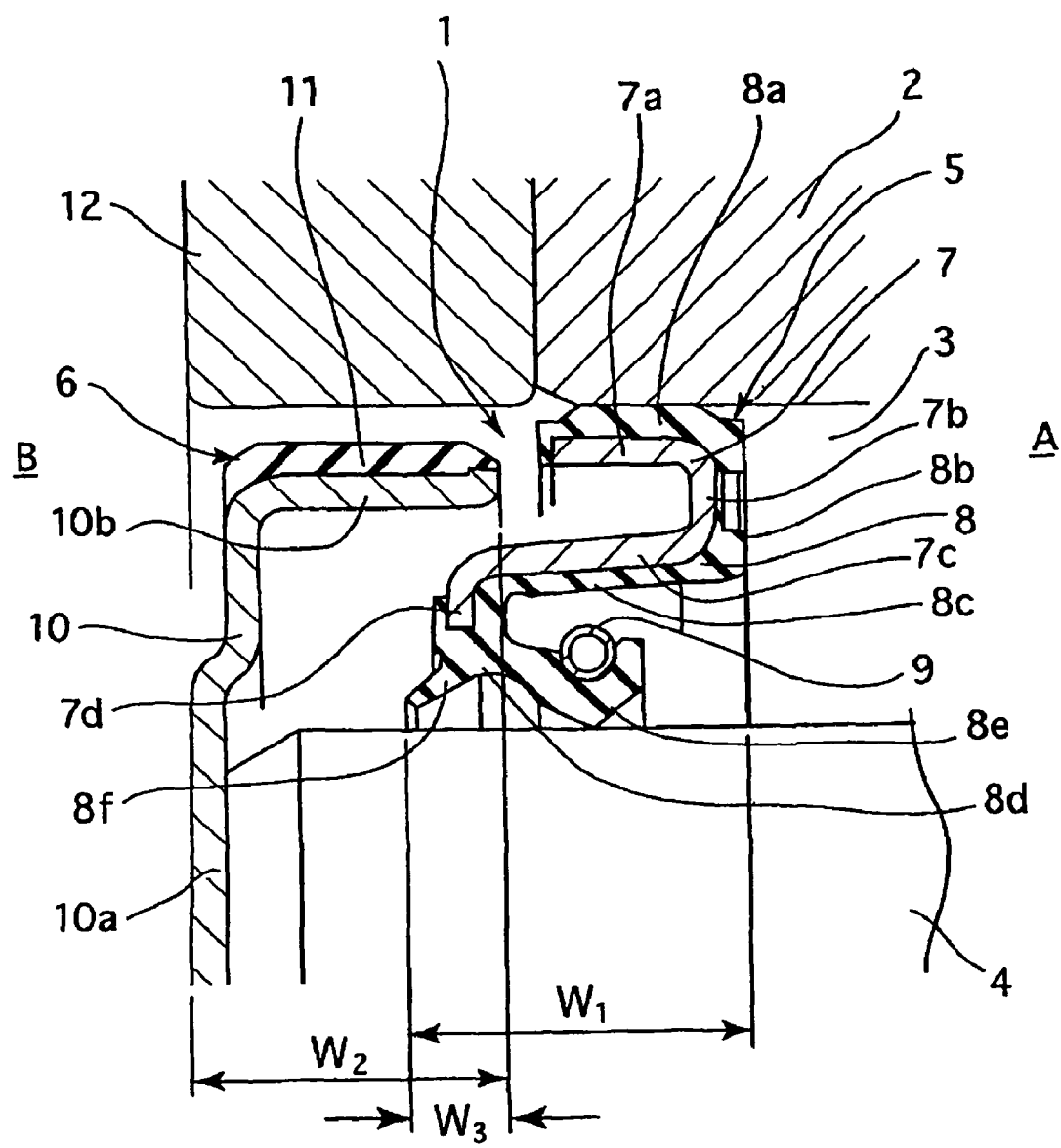
FIG. 1 is a sectional view showing a main part of the sealing device in an attached state according to a first embodiment of the present invention.

1: sealing device
2: engine block (housing)
3: shaft hole
3a: recess portion
4: crank shaft (rotating shaft)
5: oil seal
6: magnetic encoder
7: metal ring
7a: outer cylindrical portion
7b, 7f, 10d: end face portion
7c: inner cylindrical portion
7d: inner peripheral end portion
7e, 10a: flange portion
8: rubber-like elastic body
8a, 8g: outer periphery attachment portion
8b, 8h, 8k: end face attachment portion
8c, 8i: inner periphery attachment portion
8d: lip portion
8e: seal lip
8f: dust lip
8j: seal portion
9: garter spring
10: holder
10b: outer cylindrical portion
10c: inner cylindrical portion
10e: extension
11: encoder main body
12: sensing unit
A: interior side
B: exterior side

DETAILED DESCRIPTION OF PREFERRED EMBODIMENT

The embodiments of the present invention will be explained hereinafter with reference to the attached drawings.

First Embodiment

FIG. 1 is a sectional view showing a main part of the sealing device 1 according to a first embodiment of the present invention.

The sealing device 1 according to the first embodiment comprises a combined structure of an oil seal 5 mounted on an inner periphery of a shaft hole 3 of a engine block 2 as a housing and slidably contacted on an outer periphery of a crank shaft 4 as a rotating shaft, and a magnetic encoder 6 mounted on the crank shaft 4 so as to be rotated with the crank shaft 4, and further comprises the following configurations.

By the way, an interior side A of the engine block 2 is shown on the right, while an exterior side B of the engine block 2 is shown on the left in the drawings, respectively.

The oil seal 5 is comprised of the metal ring 7 and the rubber-like elastic body 8 attached to the metal ring 7. The metal ring 7 is formed by pressing a sheet metal and comprises an outer cylindrical portion 7a engaging with the inner periphery of a shaft hole 3 provided in the engine block 2, an end face portion 7b formed integrally with the outer cylindrical portion 7a so as to extend radially inwardly from the end portion thereof facing the interior side of the engine block, an inner cylindrical portion 7c formed integrally with the end portion 7b so as to extend from the inner periphery end of the end portion 7b toward the exterior side B of the engine block, and an inner peripheral end portion 7d formed integrally with the inner cylindrical portion 7c so as to extend radially inwardly from the end portion thereof facing the exterior side of the engine block.

In addition, since an outer periphery attachment portion 8a of the rubber-like elastic body 8 is attached to the outer periphery of the outer cylindrical portion 7a, as described below, the outer cylindrical portion 7a is engaged with the engine block 2 through the outer periphery attachment portion 8a.

The rubber-like elastic body 8 is an integral product of an outer periphery attachment portion 8a (outer seal portion) attached to the outer periphery of the outer cylindrical portion 7a of the metal ring 7, an end face attachment portion 8b attached to the end of the end face portion 7b facing the interior side of the engine block, an inner periphery attachment portion 8c attached to the inner periphery of the inner cylindrical portion 7c, and a lip portion 8d attached to and supported by the inner peripheral end portion 7d. The lip portion 8d is formed integrally with a seal lip (main lip) 8e facing toward the interior side A of the engine block and a dust lip 8f facing the exterior side B of the engine block. A garter spring 9 is attached to the seal lip 8e for adjusting the pressure applied to the sealing surface.

The magnetic encoder 6 comprises a holder 10 and an encoder main body 11 attached to the holder 10. The holder 10, which is formed by pressing a sheet metal, comprises an integral product of a disc-shaped flange portion (disk portion) 10a fixed to the top surface of a crank shaft 4 with a fastener such as bolts and nuts, and a cylindrical portion 10b integrally formed so as to extend from the outer periphery edge of this flange portion 10a towards the interior side A of the engine block. The encoder main body 11 having a cylindrical shape is engaged on the outer periphery of the cylindrical portion 10b.

The encoder main body 11 is made of a rubber-like elastic material mixed with magnetic powder, and has a multi-pole magnet element formed in a circumferential direction so that the rotation rate, rotational angle or the like can be sensed by reading pulse signals by means of the sensing unit 12 when rotated. In the drawings, the reference numeral 12 indicates a holder or an attached portion of the sensing unit, and the sensing unit 12 itself is attached radially inwardly to the holder or a certain place on a circumference of the attached portion.

In the above-mentioned oil seal 5 and the magnetic encoder 6, the inner cylindrical portion 7c is made longer so as to more protrude toward the exterior side B than the outer cylindrical portion 7a, and the outer diameter of the inner cylindrical portion 7c is made smaller than the inner diameter of the cylindrical portion 10b of the holder 10.

When assembling and attaching the sealing device 1, the front edge at the exterior side of the inner cylindrical portion 7c of the metal ring 7 is inserted in the inner peripheral side of the cylindrical portion 10b of the holder 10 from one axial direction (from the interior side A) together with the inner peripheral end portion 7d, lip portion 8d and the rest, and thereby oil seal 5 and the magnetic encoder 6 are partly overlapped with each other in the axial direction.

Namely, assuming that width of oil seal 5 in axial direction is $W_1$, width of the magnetic encoder 6 in axial direction is $W_2$, and width of overlapped portion is $W_3$, the installation width W of the sealing device 1 in the axial direction is shown as $W=W_1+W_2$ in case that the oil seal 5 and the magnetic encoder 6 are not overlapped. On the other hand, in case that the oil seal 5 and the magnetic encoder 6 are overlapped, $W=W_1+W_2-W_3$.

Accordingly, it becomes possible to narrow the installation width of the entire sealing device 1 in the axial direction by the overlapped amount of the oil seal and magnetic encoder. Therefore, it becomes possible to provide a sealing device with an encoder having compact structure in the axial direction.

Moreover, in the above-mentioned sealing device 1, since the oil seal 5 has a seal lip 8e formed with a rubber-like elastic body and the seal lip 8e is disposed towards the interior side A of the engine block, the adhesion to the crank shaft 4 is enhanced, and it is pressed onto the peripheral surface of a crankshaft 4 by the pressure of sealed fluid. Therefore, it is possible to provide the sealing device 1 with the encoder, which is compact in the axial direction and excellent in sealing performance.

In addition, the above-mentioned sealing device 1 may be changed in configuration as follows.

Second Embodiment

Figure 2:
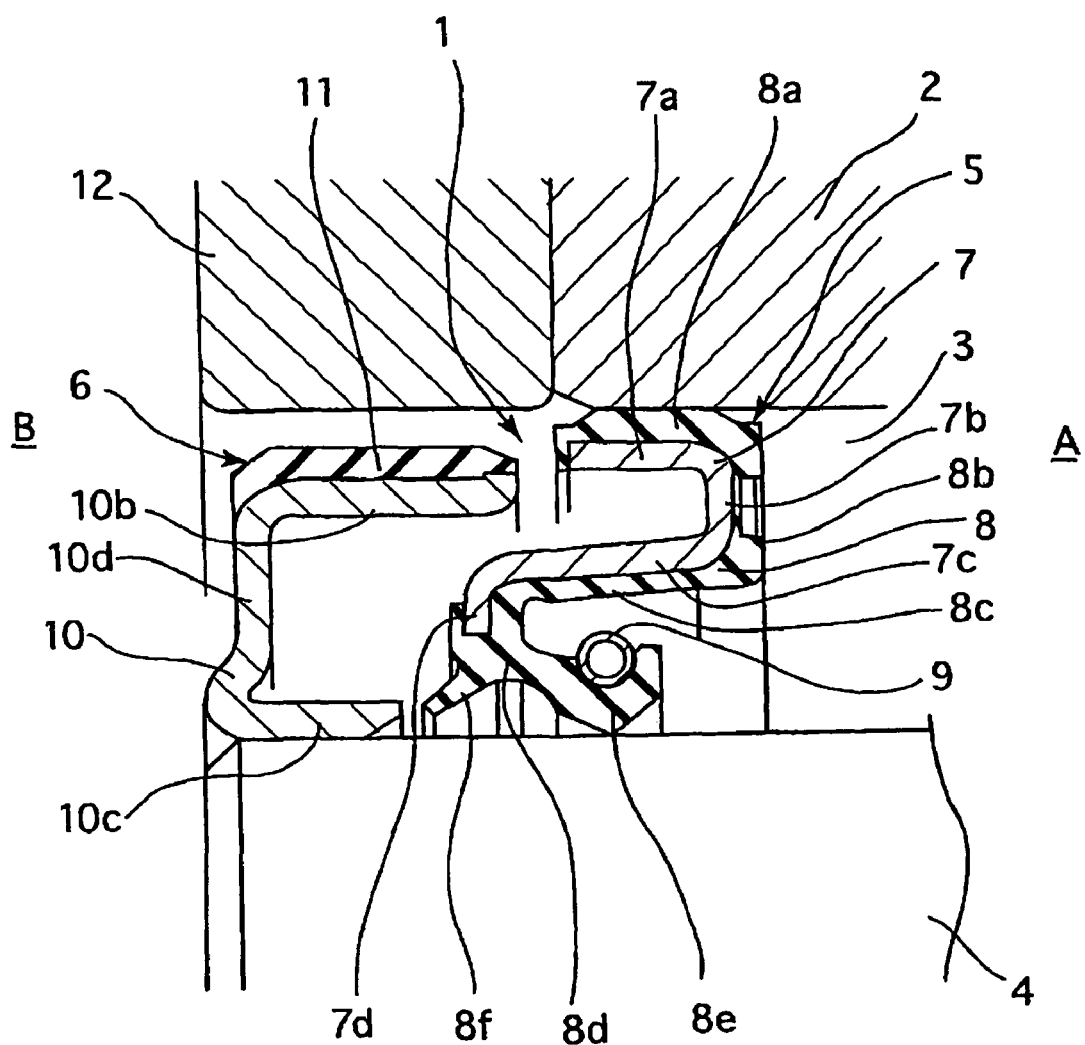
FIG. 2 is a sectional view showing a main part of the sealing device in an attached state according to a second embodiment of the present invention.

As shown in FIG. 2, the holder 10 of the magnetic encoder 6 may be formed into an annular component and fitted on the outer periphery of the crankshaft 4. In this case, the holder 10 is formed by pressing a metal sheet, and comprises an inner cylindrical portion 10c fitted on the outer surface of the crankshaft 4, an end face portion 10d integrally formed so as to extend radially outwardly from the exterior side edge of the inner cylindrical portion 10c, and an outer cylindrical portion 10b integrally formed so as to extend from the outer edge of the end face portion 10d toward the interior side A.

Third Embodiment

Figure 3:
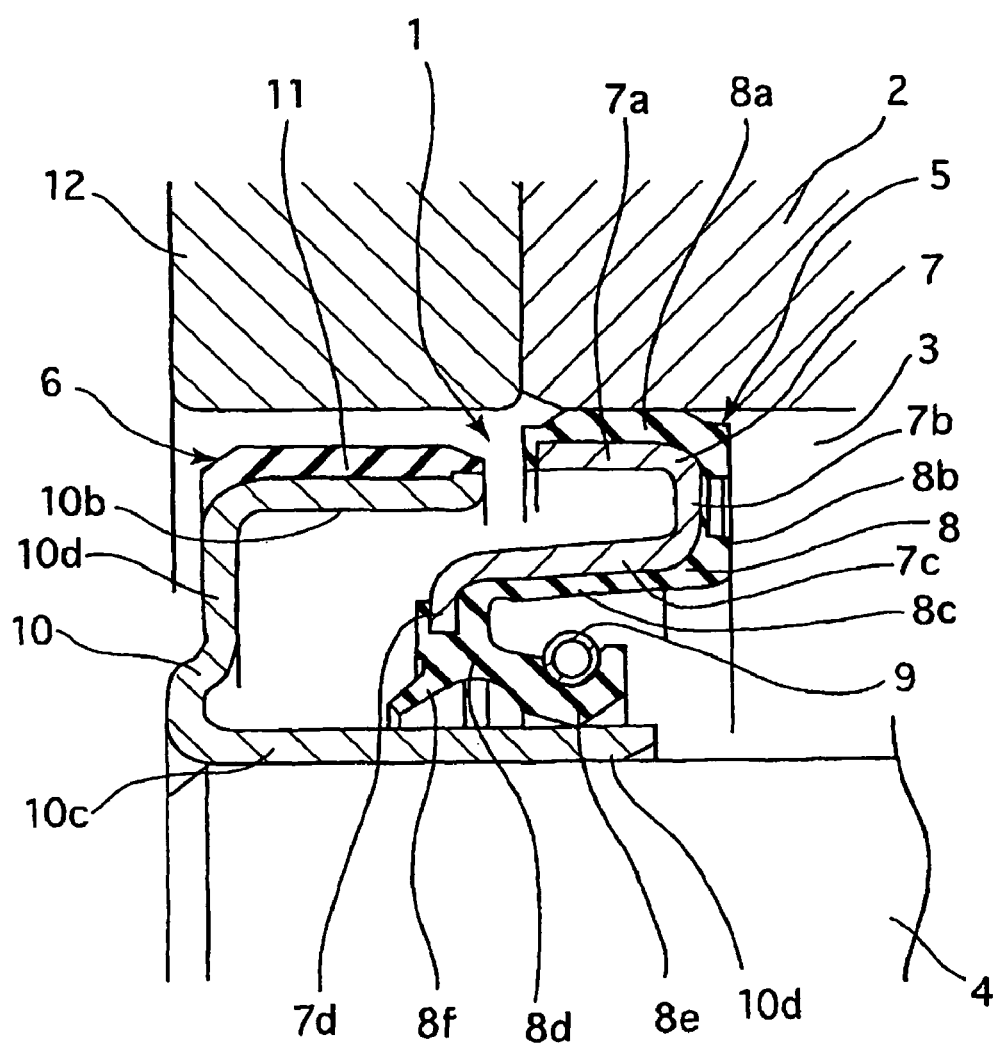
FIG. 3 is a sectional view showing a main part of the sealing device in an attached state according to a third embodiment of the present invention.

As shown in FIG. 3, the holder 10 in the example 2 may be configured such that the inner cylindrical portion 10c is extended toward the interior-side A to provide an extension 10e, and a seal lip 8e is contacted slidably to the outer surface of the extension 10e.

In this case, the holder 10 is formed by pressing a metal sheet, and comprises an inner cylindrical portion 10c fitted on the outer surface of the crankshaft 4, an end face portion 10d integrally formed so as to extend radially outwardly from the exterior side edge of the inner cylindrical portion 10c, and an outer cylindrical portion 10b integrally formed so as to extend from the outer edge of the end face portion 10d toward the interior side A, and additionally comprises an extension 10e integrally formed so as to extend from the interior side edge of the inner cylindrical portion 10c toward the interior side A.

Fourth Embodiment

Figure 4:
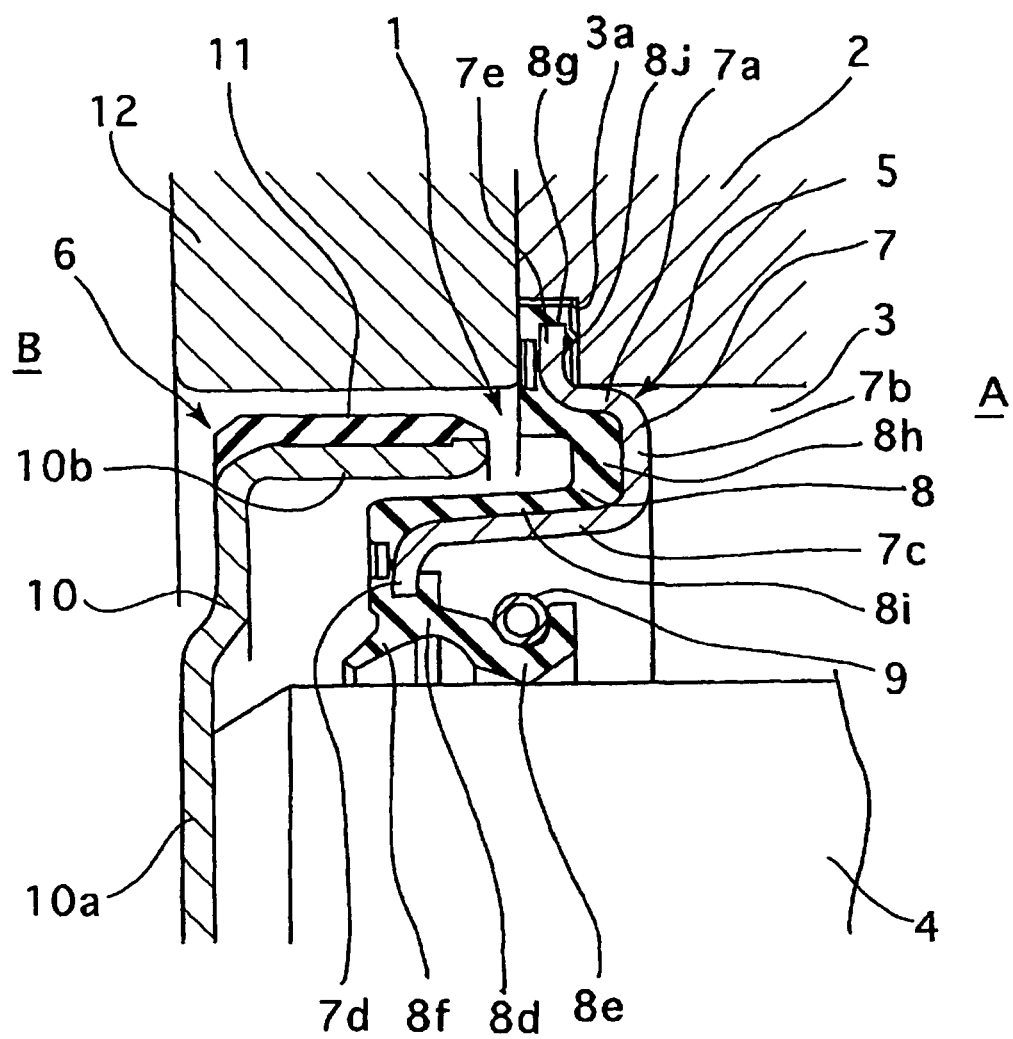
FIG. 4 is a sectional view showing a main part of the sealing device in an attached state according to a fourth embodiment of the present invention.

As shown in FIG. 4, the metal ring 7 of the oil seal 5 may be provided with an outwardly extending flange portion (outer periphery flange) 7e, and configured such that the flange portion 7e is put in a space defined between the engine block 2 and the sensing unit 12. In this case, the metal ring 7, which is formed by pressing a metal sheet, comprises an outer cylindrical portion 7a engaged in the inner periphery of the shaft hole 3 of the engine block 2, an end face portion 7b integrally formed so as to extend radially inwardly from the interior side edge of the outer cylindrical portion 7a, an inner cylindrical portion 7c integrally formed so as to extend from the inner peripheral edge of the end face portion 7b toward the exterior side B, and an inner peripheral end portion 7d integrally formed so as to extend radially inwardly from the exterior side edge of the inner cylindrical portion 7c, and additionally comprises the flange portion 7e integrally formed so as to extend radially outwardly from the exterior side edge of the outer cylindrical portion 7a.

Further, the rubber-like elastic body 8 comprises an integral product of an outer periphery attachment portion (outer periphery sealing portion) 8g attached to the interior side end face, outer peripheral surface and the exterior side end face of the flange portion 7e of the metal ring 7, an end face attachment portion 8h attached to the exterior side end face of the end face portion 7b, an inner periphery attachment portion 8i attached to the outer surface of the inner cylindrical portion 7c, and a lip portion 8d attached to and supported by the inner peripheral end portion 7d. The lip portion 8d is formed integrally with a seal lip (main lip) 8e facing the interior side A and a dust lip 8f facing the exterior side B.

Moreover, annular recess portion 3a is provided at the opening peripheral edge of the shaft hole 3 in the engine block 2 so that the flange portion 7e of the oil seal 5 is engaged therein. A bead-like sealing portion 8j is integrally formed with the outer periphery attachment portion 8g toward the interior side A so as to closely contact with the inner surface of the recess portion 3a.

Fifth Embodiment

Figure 5:
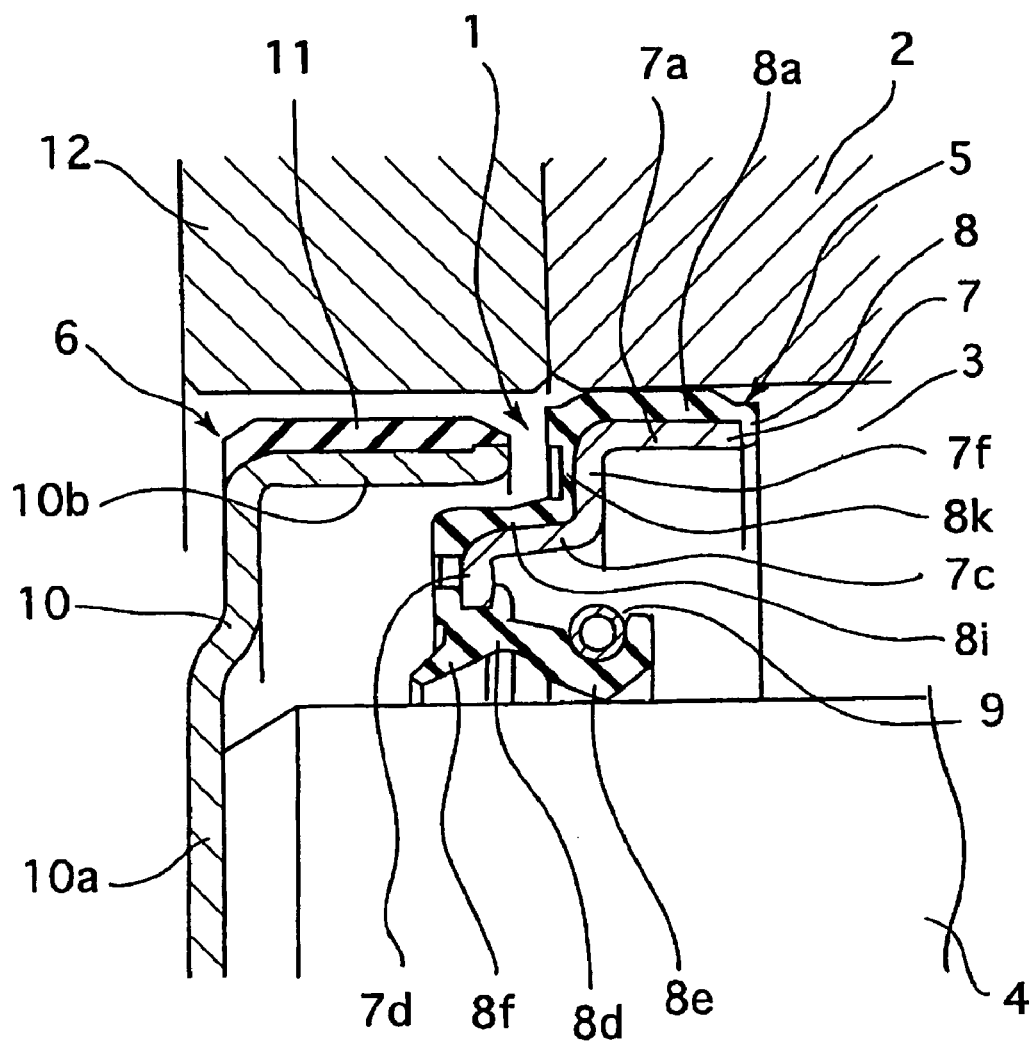
FIG. 5 is a sectional view showing a main part of the sealing device in an attached state according to a fifth embodiment of the present invention.

Further, in the sealing device 1 as shown in FIG. 5, the metal ring 7, which is formed by pressing a metal sheet, comprises an outer cylindrical portion 7a engaged on the inner periphery of the shaft hole 3 of the engine block 2, an end face portion 7f integrally formed so as to extend radially inwardly from the exterior side edge of the outer cylindrical portion 7a, an inner cylindrical portion 7c integrally formed so as to extend from the inner peripheral edge of the end face portion 7f toward the exterior side B, and an inner end portion 7d integrally formed so as to extend radially inwardly from the exterior side edge of the inner cylindrical portion 7c.

Further, the rubber-like elastic body 8 comprises an integral product of an outer periphery attachment portion (outer periphery sealing portion) 8a attached to the outer peripheral surface of the outer cylindrical portion 7a of the metal ring 7, an end face attachment portion 8k attached to the exterior side end face of the end face portion 7f, an inner periphery attachment portion 8i attached to the outer peripheral surface of the inner cylindrical portion 7c, and a lip portion 8d attached to and supported by the inner peripheral end portion 7d. The lip portion 8d is formed integrally with a seal lip (main lip) 8e facing the interior side A and a dust lip 8f facing the exterior side B.

Sixth Embodiment

Figure 6:
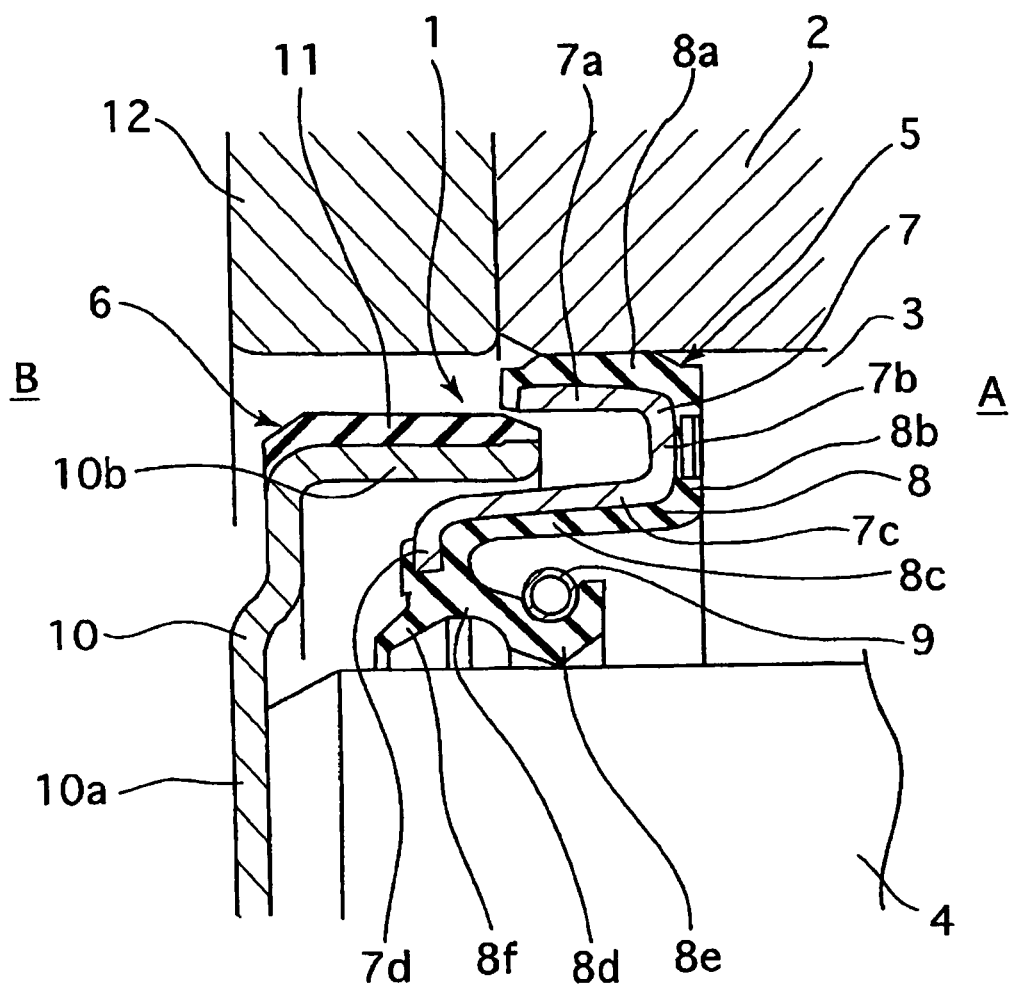
FIG. 6 is a sectional view showing a main part of the sealing device in an attached state according to a sixth embodiment of the present invention.
Figure 7:
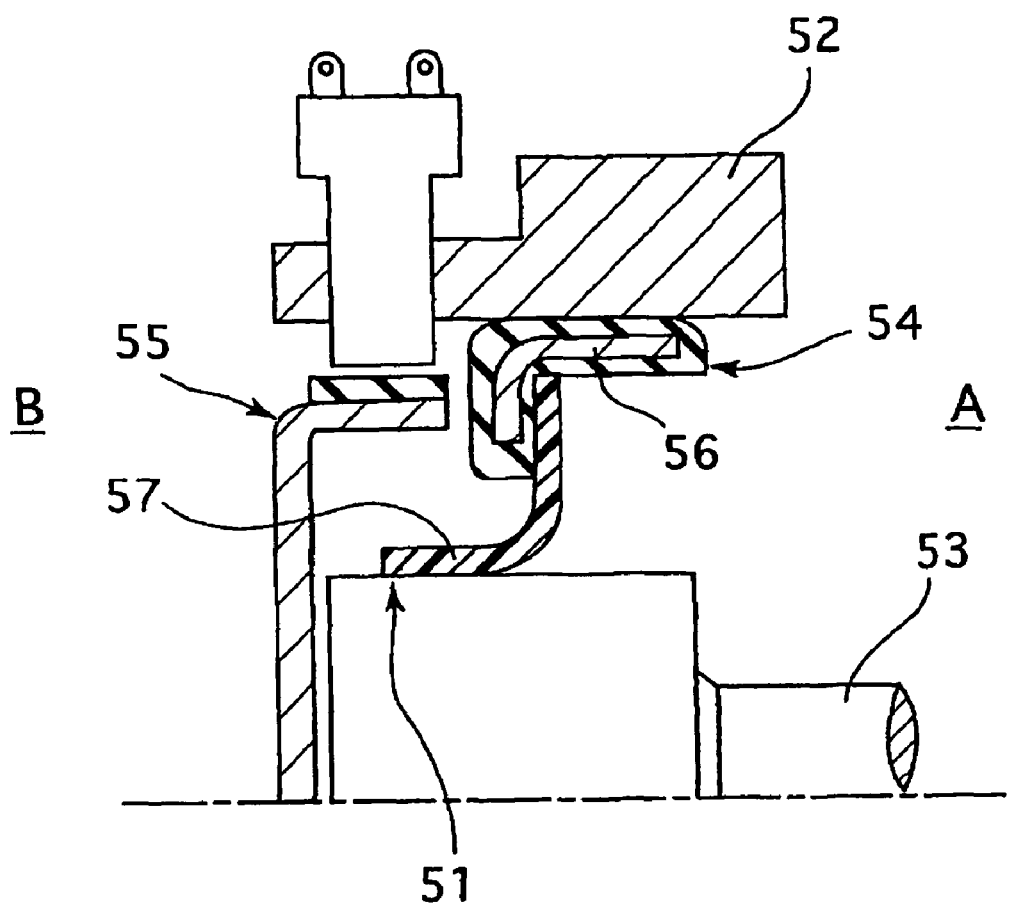
FIG. 7 is a sectional view showing a main part of the sealing device in an attached state according to the conventional art.

Furthermore, in the sealing device 1 as shown in FIG. 6, the metal ring 7 in the oil seal 5 is configured such that the inner cylindrical portion 7c is made longer so as to more protrude toward the exterior side B than the outer cylindrical portion 7a, and the outer diameter of the inner cylindrical portion 7c is made smaller than the inner diameter of the cylindrical portion 10b of the holder 10 in the magnetic encoder 6. In addition, the magnetic encoder 6 is configured so that the outer diameter of the encoder main body 11 is made smaller than the inner diameter of the outer cylindrical portion 7a of the metal ring 7 in the oil seal 5.

Accordingly, when assembling and attaching the sealing device 1, the front edge of the inner cylindrical portion 7c of the metal ring 7 at the exterior side B is disposed at the inner periphery side of the magnetic encoder 6, and the front edge of the magnetic encoder 6 at the interior side A is disposed at the inner periphery side of the outer cylindrical portion 7a of the metal ring 7. Accordingly, as compared with the first embodiment (shown in FIG. 1) the installation width W of the entire sealing device 1 can be further reduced, since the overlap width $W_3$ can be set large by the overlapped amount between the front edge at the interior side of the magnetic encoder 6 and the inner periphery side of the outer cylindrical portion 7a of the metal ring 7 in the axial direction. Since the front edge of the magnetic encoder 6 at the interior side A, i.e. the front edge of the encoder main body 11 at the interior side A (tapered portion in FIG. 6) is not utilized as a sensing unit, the magnetic encoder 6 functions without any problem. Further, when the oil seal 5 and the magnetic encoder 6 are disposed so as to be overlapped with each other as described above, labyrinths are formed between them, thereby the improved sealing performance can be expected.

What is claimed is:

1. A sealing device with an encoder comprising a combination of an oil seal mounted in an inner periphery of a shaft hole of an engine block and a magnetic encoder mounted on an end portion of a crank shaft inserted in the shaft hole, wherein the oil seal is provided with a metal ring including an outer cylindrical portion engaged in the inner periphery of the shaft hole and an inner cylindrical portion formed integrally with the outer cylindrical portion through an end face portion, and a seal lip attached to the inner cylindrical portion and formed from a rubber-like elastic body facing toward an interior side, wherein the magnetic encoder has a holder fixed on the crank shaft, and a cylindrical encoder main body attached to an outer surface of a cylindrical portion provided on the holder, said encoder main body having a sensing unit attached to an end portion of the engine block to read magnetic signals, and wherein the metal ring is configured such that the inner cylindrical portion is made longer so as to more protrude toward an exterior side than the outer cylindrical portion, and a front edge at the exterior side of the inner cylindrical portion is inserted in an inner peripheral side of the cylindrical portion of the holder from the interior side, whereby the oil seal and the magnetic encoder are overlapped with each other in the axial direction.

2. A sealing device with an encoder as claimed in claim 1, wherein the oil seal is provided with a metal ring having a flange portion extending outwardly, and the outwardly extending flange portion is engaged with a recess portion formed in an opening peripheral edge of the shaft hole of the engine block, whereby the oil seal is attached.

3. A sealing device as claimed in claim 1, wherein the front edge at the exterior side of the inner cylindrical portion of the metal ring of the oil seal is disposed at the inner periphery side of the magnetic encoder, and the front edge at the interior side of the magnetic encoder is disposed at the inner periphery side of the outer cylindrical portion of the metal ring, whereby the oil seal and the magnetic encoder are overlapped with each other in the axial direction.

* * * * *